United States Patent [19]

Prestridge et al.

[11] Patent Number: 4,606,801

[45] Date of Patent: Aug. 19, 1986

[54] ELECTROSTATIC MIXER/SEPARATOR

[75] Inventors: Floyd L. Prestridge, Sapulpa; Bruce C. Johnson, Broken Arrow, both of Okla.

[73] Assignee: Combustion Engineering, Inc., Windsor, Conn.

[21] Appl. No.: 755,524

[22] Filed: Jul. 16, 1985

[51] Int. Cl.$^4$ ............... B01D 17/06; C10G 33/02
[52] U.S. Cl. ............................ 204/186; 204/305
[58] Field of Search ............. 204/188, 189, 190, 191, 204/302, 305

[56] References Cited

U.S. PATENT DOCUMENTS 4,161,439 7/1979 Warren ............................ 204/306
4,400,253 8/1983 Prestridge ........................ 204/186

Primary Examiner—T. M. Tufariello
Attorney, Agent, or Firm—Arthur L. Wade; David L. Smith

[57] ABSTRACT

Electrodes, in the form of plates, are held parallel to each other to form passageways in which electrostatic fields are generated when the plates are charged by a source of variable voltage. The variable voltage is programmed to establish an initial electrostatic field strong enough to mix polar and nonpolar fluids. The mixture is then flowed through the electrostatic field which is of the strength needed to coalesce the polar fluids which have united with a contaminant in the nonpolar fluid.

6 Claims, 7 Drawing Figures

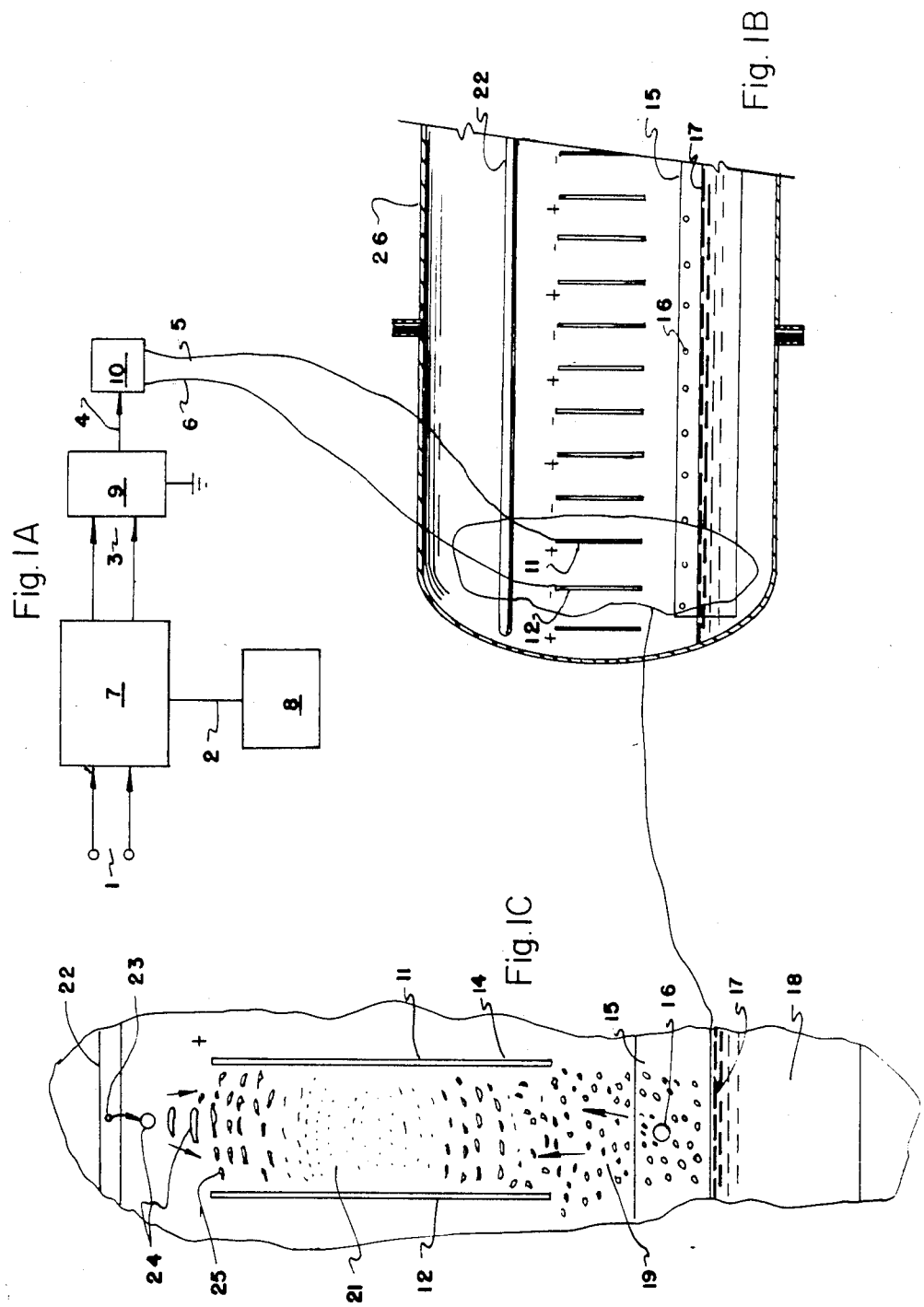

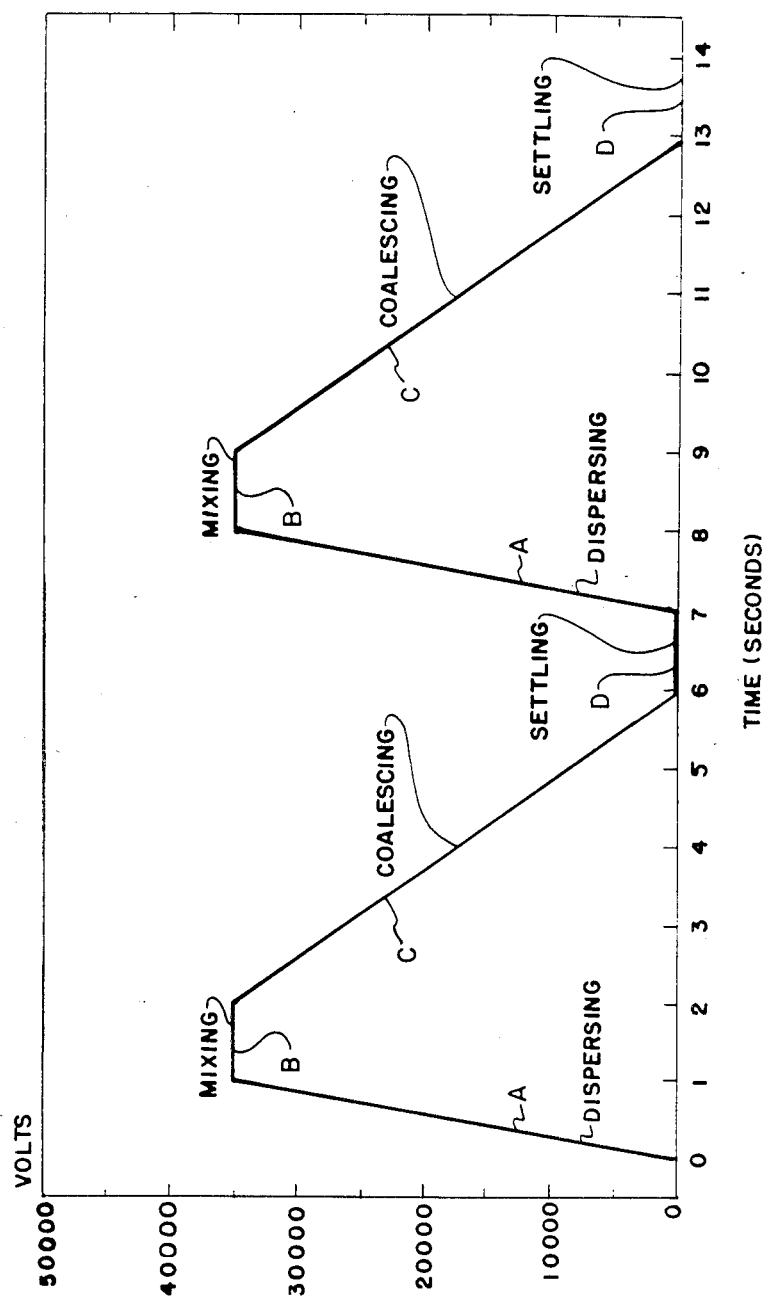

ELECTROSTATIC MIXER/SEPARATOR

TECHNICAL FIELD

The present invention relates to a method and apparatus for dispersing or mixing relatively polar fluids in a relatively nonpolar fluid. More particularly, the invention relates to electrostatic fields modulated to effectively mix and separate these fluids.

BACKGROUND ART

There are many industrial processes which require shearing polar fluids and dispersing them throughout nonpolar fluids with which they are immiscible, followed by subsequent coalescence to separate the polar and nonpolar fluids. In the oil field, water is a polar fluid dispersed in a nonpolar, organic fluid (oil). In order to extract the connate brine dispersed in the oil, water that is less saline than the connate brine must be added and sheared to a size which will unite with the connate brine. Up to the present, the shearing has been carried out by taking a pressure drop in the mixture consisting of the added fresh water, brine, and oil to obtain the mixing and union of the brine and sheared fresh water drops.

Methods for coalescing and separating connate water from oil by electrostatic fields are well defined in the art. Representative of this art are the disclosures in Prestridge, U.S. Pat. Nos. 3,772,180 and 3,847,775. Briefly, an electrostatic field, through which the water-contaminated oil is passed, coalesces the water dispersed in the oil into larger droplets. The coalesced droplets reach the size which enables them to gravitate in separation from the oil that is flowed through the electrostatic field. The oil is removed through an outlet near the top of the vessel. The coalesced water is removed from a body of water formed by the collected droplets in the bottom of the vessel.

Warren, et al. U.S. Pat. Nos. 4,161,439 and 4,204,934 disclose some of the first work in generating electrostatic fields for the purpose of mixing polar and nonpolar fluids. In this system, the electrode spacing was varied or independent sets of electrodes were used which were powered by separate power sources. This was done in order to generate electrostatic fields of sufficient strength for dispersing and mixing, followed by fields of lesser strength for coalescing and separation. However, with this arrangement, the sustained high field strength in the mixing areas collected and held the conductive polar phase between the electrodes. This limits the operation of the system since the accumulated water in the high field strength (mixing) area inevitably forms a path of sufficient conductivity to cause shorting between the electrodes. There is a need to reduce or stop this shorting. In addition to obviating shorting, improvements are needed in the system which will further reduce a contaminant level in one of the fluids.

DISCLOSURE OF THE INVENTION

The present invention contemplates modulating the output of an electrical power source supplying energy to at least a pair of electrodes which are used to establish an electrostatic field for the purpose of first mixing and then separating immiscible fluids in the electrostatic field. This modulation is effective since it is employed to decrease the high intensity field for a predetermined length of time in order to alleviate the continued collection and increasing concentration of the polar fluid at a given location between the electrodes, thereby obviating the shorting problem of the system of Warren, et al. supra. Modulation also allows for short periods of very high field strength for shearing and dispersing the polar immiscible fluid in the nonpolar fluid. This action is followed by a controlled lowering of the electrostatic field strength to coalesce the polar fluid for subsequent gravitational separation from the nonpolar fluid. This sequential mixing and separation is carried out in order to transfer a contaminant from one fluid to another fluid, depending upon the chemistry of the fluids.

Other objects, advantages and features of this invention will become apparent to one skilled in the art upon consideration of the written specification, appended claims, and attached drawings.

BRIEF DESIGNATION OF THE DRAWINGS

FIG. 1A is a block diagram of the circuit embodying the present invention;

FIGS. 1B and 1C are sectioned elevations of the vessel containing the electrodes energized by the circuit in FIG. 1A;

FIG. 4 is a graph of the variation of the applied voltage to the electrodes with time.

BEST MODE FOR CARRYING OUT THE INVENTION

Figure 2A:
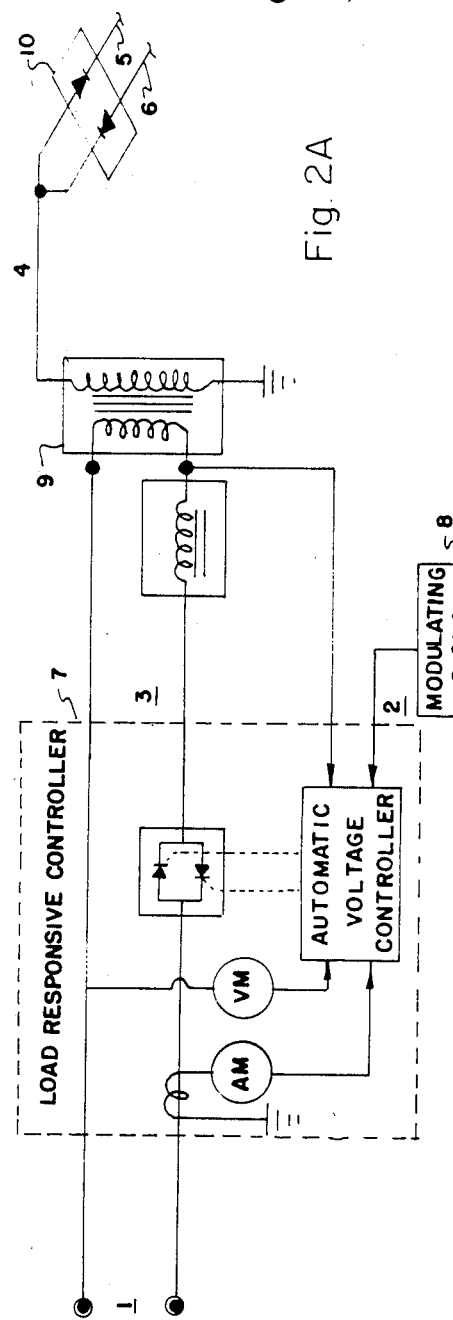
FIG. 2A is a block diagram more completely disclosing the circuit of FIG. 1A.

It must be understood that this invention transfers a contaminant between one or more relatively nonpolar fluids and one or more relatively polar fluids, with the polar and nonpolar fluids immiscible in each other. These contaminants include at least sodim chloride (salt) solids, metal ions, etc. The following disclosed system of the invention specifically transfers a contaminant originally present in nonpolar fluid to the polar fluid.

The present invention includes a new improved method and structure for utilizing electrostatic fields to mix and separate two immiscible fluids. In the preferred embodiment of FIGS. 1A–4, the dispersed polar fluid is brought into contact with a contaminant of the relatively nonpolar fluid to unite with the contaminant, and droplets of the united contaminant and polar fluid then coalesce for removal from the relatively nonpolar fluid. Although electrostatic forces have been previously demonstrated to be a viable means of mixing and/or separating polar fluids in an immiscible nonpolar fluid (U.S. Pat. Nos. 4,204,934 and 4,308,127), the application of electrostatic mixing has been confined to closely controlled laboratory tests. Commercialization of the electrostatic mixing process has not been reduced to practice due to the limited range of conditions under which it could be successfully utilized. The major limitation preventing the commercialization of such systems is the fact that when sufficient voltage is applied to the electrodes to cause satisfactory mixing, the polar fluids accumulate within the mixing zone, ultimately forming a conductive path, which allows arcing or shorting to occur between the electrodes. The method utilized by the present invention to overcome this problem is to modulate the strength of the electrostatic field. This modulation reduces or stops arcing, as it provides time for the gravitation of the coalesced polar droplets from the mixing zone, thereby elminating the conductive path which creates the arcing between the electrodes.

One means of modulating the electrostatic field strength is by utilizing a control system such as disclosed in FIG. 1A. The normal function of a controller 7 is to monitor the power consumed by the system and control the voltage to a transformer 9, thereby maintaining safe operating limits. Controller 7 is constructed and arranged in accordance with the disclosure of U.S. Pat. No. 4,400,253, issued Aug. 23, 1983 to A. A. Shultz, et al. The control system of FIG. 1A is simply representative of many means which could be used to modulate the field strength at the electrodes. The source voltage for controller 7 is applied to input terminals 1. A predetermined control signal 2 from a signal generator 8 is the signal which ultimately produces the desired modulation of the electrostatic field strength at the electrodes. This signal is applied to controller 7 in order to modulate the controller output 3 being supplied to the primary side of transformer 9. Since the modulation characteristics of the voltage to the primary side of the transformer are transferred to the secondary or high voltage side, the desired high voltage output 4 from transformer 9 is achieved. The transformer output is then fed to a rectifier system 10 producing rectified voltages on leads 5 and 6. These rectified voltages are applied to the respective electrodes 11 and 12, disclosed in FIGS. 1B and 3, generating the desired predetermined modulated field strength. FIG. 1B discloses the preferred arrangement of the electrodes, of which 11 and 12 are representative. The electrode system is mounted within a vessel 26, along with an inlet spreader 15 beneath the electrodes, and a polar fluid header 22 above the electrodes. FIG. 1C is a more detailed view of a pair of electrodes 11 and 12, a section of inlet spreader 15 and the polarfluid header 22. The contaminated, relatively nonpolar fluid enters the system through inlet spreader 15, is distributed through orifices 16, and flows up through the modulated electrostatic field generated between electrodes 11 and 12. Although vertical flow for the contaminated, relatively nonpolar fluid is preferred, the invention is not limited to this configuration, as the contaminated fluid may be flowed in any direction to enter the electrostatic field. At the same time, a polar fluid 24 is introduced through header 22 and falls into the electrostatic field, which is modulated to first shear the polar fluid into small droplets and disperse them into the relatively nonpolar fluid where they are mixed with the contaminant. These dispersed droplets then contact and unite with the contaminant in the nonpolar fluid and are coalesced into droplets large enough to gravitate through the electrostatic field between the electrodes. This sequence is repeated many times as the fluid moves through the electrostatic field, allowing the polar fluid to gravitate downward and producing numerous countercurrent mixing stages. When used in this countercurrent flow configuration, the system becomes an extremely efficient and cost-effective, multi-stage mixer/separator of fluids. The preferred direction of polar fluid flow is vertical, but again, any flow direction which will terminate in the electrostatic field falls under the scope of the invention.

Desalting

The tremendous benefits of the electrostatic multistage mixing/separation invention are best realized by comparing it to the present state-of-the-art in separation processes. A good example of the present art is the crude oil desalting process in which a contaminant (sodium chloride) in crude oil must be substantially reduced before this relatively nonpolar fluid can be processed by a refinery.

In a typical crude oil desalting process, from 2 to 10 times as much dilution water (fresh or less saline water) as the original brine present is injected into the crude oil stream. The entire stream is then passed through a large pressure let-down valve (pressure drop approximately 15–40 psi) in order to generate numerous small dilution water droplets and thereby increase the probability of the dispersed brine contacting and uniting with the dilution water. The diluted crude oil stream is then dehydrated in a mechanical and/or electrical dehydration vessel with the object of removing the water droplets united with brine from the crude oil. Unfortunately, the amount of salt that can be removed in a single desalting stage is dependent on the amount of dilution water used, since this determines the maximum salt removal that can be achieved. As a result, at least a second stage of treatment is usually needed which requires additional dilution water, pressure let-down, and dehydration, before a permissible salt level in the crude oil is achieved.

In a typical 100,000 bbl/day two-stage desalting system or "train", two large (approximately 12' diameter $\times$ 80' long) dehydration vessels are usually required, plus the pumps, valves, and horsepower needed to maintain two stages of pressure drop. With comparable flow rates, and a system utilizing the present invention, only one vessel of similar dimensions to the vessel described in the prior art is needed and this vessel serves as both the mixer and dehydrator. In addition, none of the pumps, valving, or pressure drop horsepower associated with the conventional desalting process is required. Although electrical power is required to charge the electrodes in the present invention, this power is minimal since it is primarily expended on supplying energy to the polar or aqueous fraction of the fluid which represents only a small fraction of the total fluid flow.

DETAILED EXPLANATION OF THE SYSTEM

Figure 2B:
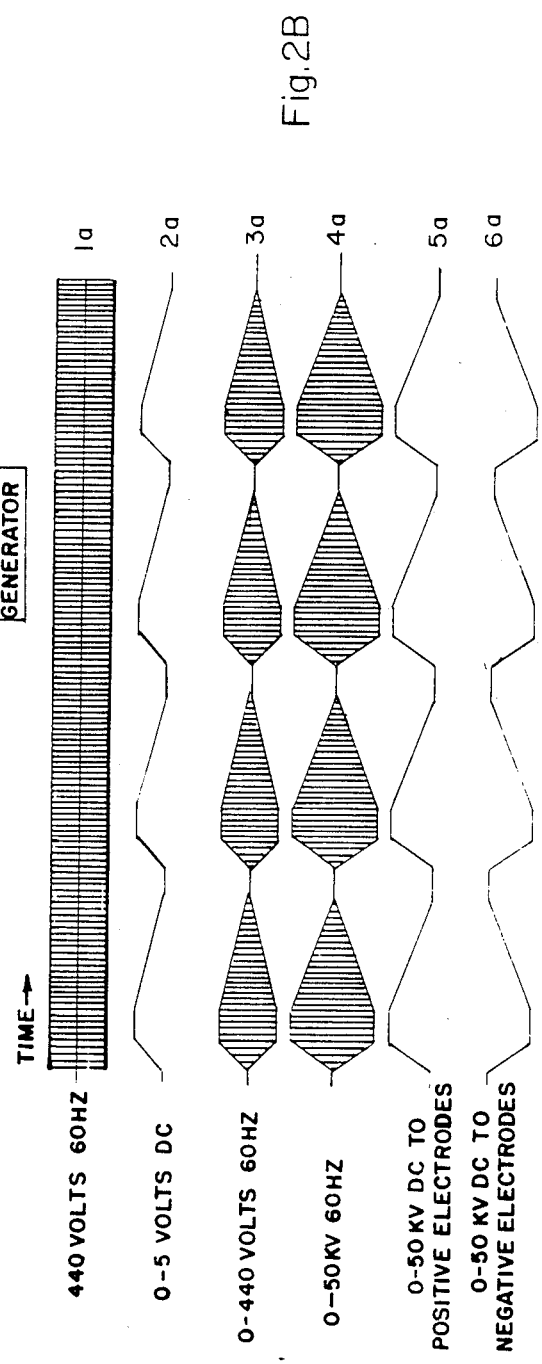
FIG. 2B shows voltage waveforms which exist at specific locations within the circuit.
Figure 3:
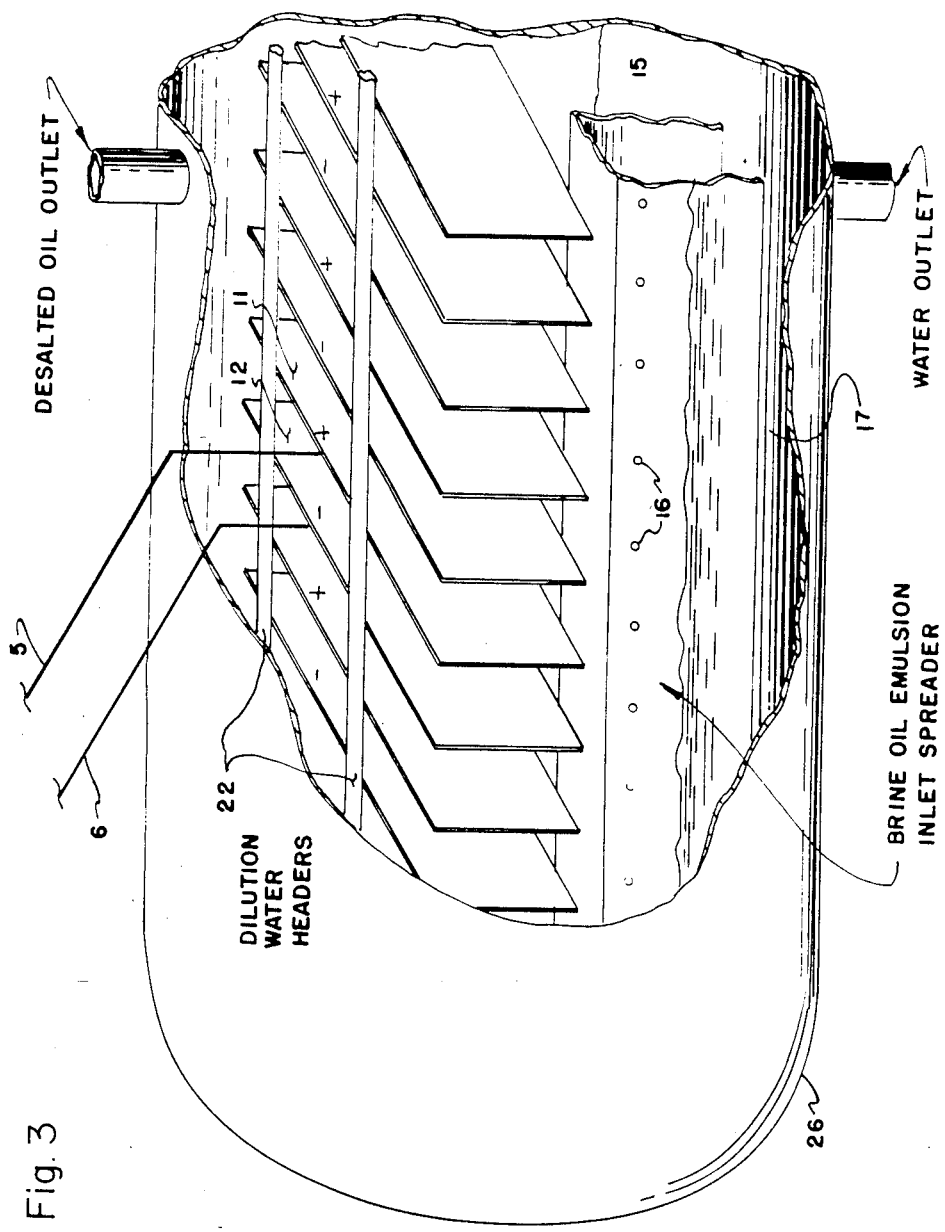
FIG. 3 is an isometric sectioned perspective of the vessel of FIG. 1B.

FIG. 2A is a functional block diagram of a control system showing the basic electrical components utilized to obtain the objectives of the invention. FIG. 2B depicts typical wave forms that exist between components of the control system and their location on the block diagram.

As previously stated, a key function of controller 7 is to protect the system from electrical overloads. When a source voltage 1a is applied to input terminals 1 of the controller, the controller applies voltage to the primary of transformer 9. By monitoring current and voltage feedback signals, the controller, if needed, will readjust the primary voltage to the transformer, thereby maintaining the system within safe operating limits. Also, control signal 2a may be introduced into the control circuit at point 2 of controller 7 to modulate its output 3, producing waveform 3a which is applied to transformer 9. Transformer 9 steps up the changing voltage signal producing output 4 with waveform 4a and applies this modulated output to the rectifier system 10. There are two outputs from the rectifier system. A positive high voltage DC 5a applied to the positive set of electrodes 11 and a negative high voltage DC 6a to the negative electrodes 12.

Never lost to view, the control system disclosed in FIG. 2A is merely representative of other circuits which are capable of producing the same voltage applied to the electrodes between which the electrostatic fields are generated. The ultimate objective is to control the strength of the electrostatic field between the electrodes. FIG. 2A shows one system for doing this. In clarification, one aspect of the invention is the creation of the electrostatic field to first mix and disperse a polar fluid in a relatively nonpolar fluid, the distributed polar fluid contacting and uniting with the contaminant of the nonpolar fluid. The united polar fluid and contaminant are next coalesced by the progressively decreasing electrostatic field strength, followed by a minimum field strength for a finite length of time to permit the now contaminated polar fluid to gravitate and separate from the nonpolar fluid.

FIG. 4 discloses a typical waveform arrived at in a pilot operation. As disclosed in FIG. 4, step A, the initial rise in applied voltage is termed dispersing, since the voltage is rapidly raised to the mixing value at a rate that will avoid arcing. Step B, mixing, represents the finite period of time that the maximum voltage is applied for satisfactory mixing. Step C, coalescing, consists of a decreasing applied voltage which induces coalescence of the now contaminated, relatively polar fluid droplets, their size increasing as the voltage decreases. Step D, settling, represents the time that minimal voltage is applied, to allow the coalesced droplets to settle from the relatively nonpolar fluid. This cycle is repeated in a continuous operation of dispersing/mixing/ coalescing/settling—dispersing/mixing/coalescing/settling.

Modulation of the electrostatic field includes the steps and therefore the frequency at which the steps are repeated. The percentage of time per cycle that the voltage is at maximum and minimum (steps 2 and 4 respectively), is important since a balance must be reached in which sufficient high voltage time is maintained to ensure adequate mixing, and low voltage time to allow the coalesced relatively polar phase to separate from the relatively nonpolar fluid. A properly regulated cycle time maximizes the amount of mixing and separation that can be accomplished in a given time and, therefore, affects the size of a given system. The rate at which the voltage is applied (step A) is also important since it is necessary to break up and disperse large polar fluid droplets before the maximum mixing voltage can be applied (minimizes arcing). More important, however, is the rate at which the voltage is decreased after the mixing period (step C), since the rate at which any coalescence can take place is determined by the fluid properties of the system. Therefore, to produce maximum droplet size, the coalescing voltage should not be decreased faster than the droplets can grow. Large droplet size is essential if they are to settle rapidly in the nonpolar fluid. Although FIG. 4 depicts a specific waveform representing precise operating voltage value, these values were empirically determined for a given emulsion and operating conditions, and systems using different fluid flowrates or fluid properties will require different cycle times and waveforms to achieve optimum performance.

Pilot scale testing in a continuously operating system has shown excellent results when varying the voltage in accordance with FIG. 4. In evaluating the invention as a desalter of crude oil receiving a 0.5% by volume brine (200,000 ppm salt) dispersed in the oil continuous emulsion with 1.0% volume countercurrent dilution (fresh water) flow, a salt removal of 99.93% was obtained. This is an equivalent to reducing the salt content from 400 lbs. salt per 1000 barrels of oil to 0.3 lb. salt per 1000 barrels of oil. The viscosity of the oil phase was 53 SSU's at the testing temperature and the flow rate was equivalent to 300 barrels oil per day per sq. ft. The maximum voltage applied to the electrodes was 45,000 volts. An electrode spacing of 3" was used during the test.

The same pilot unit was also configured to test the salt removal efficiency of a single-stage present state-of-the-art desalting process operating under similar conditions. In this configuration, the dilution water was introduced concurrently upstream of a mixing valve which utilized a 15 psi pressure drop. A constant electrostatic voltage was applied to the electrodes to dehydrate the mixture to the same aqueous outlet cut (0.1%) achieved by the electrostatic mixer/separator test reported previously. All other variables such as flow rates, temperatures, fluid concentrations, etc. were held the same. Results from these tests showed that the conventional configuration was only able to obtain approximately 80% salt removal. This would be the equivalent of reducing the salt in the oil from 400 lbs. salt per 1000 barrels to 80 lbs. per 1000 barrels, as compared to only 0.3 lb. for the new invention. This establishes the superiority of the present invention over the prior art and shows that at least two stages of the present art are required to achieve the salt removal levels capable with the present invention.

Liquid-Liquid Exchange Systems

The present invention can be used in any liquid-liquid exchange system in which effective mixing and separation of immiscible polar and nonpolar solutions is required. These systems include, but are not limited to, the recovery of those products that can be dissolved out of their ore by weak acids, such as those systems employed in the recovery of uranium and copper.

One representative system in which the present invention can be used is in the hydro metalurgical mining system of Prestridge, U.S. Pat. No. 4,120,769, issued Oct. 17, 1978. In this system, three fluid circuits are disclosed for the illustration of transferring copper from ore into a final circuit for an electrowinning process to complete the recovery. The first circuit contains a weak acid (polar solution) in the extractor loop to dissolve the copper from the ore. This weak acid of the extractor loop is thereby made pregnant with the copper. The second loop contains a selective ion exchange compound in a nonpolar organic carrier which is engineered to remove the copper from the pregnant weak acid. Next, the ion exchange compound loaded with copper is mixed with an acid strong enough for the hydrogen ions to displace the copper from the loaded ion exchange compound and regenerate the compound with the hydrogen ions. The copper can then be removed from the strong acid by an electrowinning process.

Additionally, the system disclosed in the patent is an example of how metallic values can be regarded as contaminants, despite their eventual worth. Also, in the present invention, the contaminant can be lodged in either a polar, or a nonpolar fluid circuit. All that remains is to properly engineer the chemistry of the hydraulic loops to effect the transfer when any two of the loops are mixed and separated.

From the foregoing, it will be seen that this invention is one well adapted to attain all the ends and objects hereinabove set forth, together with other advantages which are obvious and inherent to the method and apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

We claim:

1. The method of dispersing a relatively polar fluid immiscible within a relatively nonpolar fluid for the purpose of extracting a contaminant in one of the fluids, including,
   first flowing the relatively nonpolar fluid between at least a pair of electrodes,
   secondly flowing the relatively polar fluid immiscible in the nonpolar fluid between the pair of electrodes,
   applying a voltage to the electrodes to establish an electrostatic field having the strength to shear and disperse the relatively polar fluid into the nonpolar fluid,
   maintaining a strength of the electrostatic field to accomplish mixing the polar fluid with the nonpolar fluid in order that the contaminant shifts from one fluid to the other,
   reducing the voltage applied to the electrodes to coalesce the dispersed relatively polar fluid,
   and maintaining a low voltage on the electrodes for a predetermined period to allow coalesced droplets of polar fluid to settle and separate from the nonpolar fluid.

2. The method of Claim 1, in which,
   the relatively nonpolar fluid is flowed upward through the electrostatic field,
   and the relatively polar fluid is flowed countercurrent to the relatively nonpolar fluid.

3. The method of Claim 1, wherein,
   the contaminant is in the relatively nonpolar fluid.

4. The method of Claim 2, wherein,
   the contaminant is in the relatively polar fluid.

5. The method of Claim 1, in which,
   the contaminant is brine in the nonpolar fluid,
   the polar fluid is water,
   and the united polar fluid and brine are subsequently removed by dehydration.

6. A structure for removing a contaminant from a relatively nonpolar fluid, including,
   at least one pair of electrodes to establish an electrostatic field,
   a source of contaminated and relatively nonpolar fluid flowed through the electrostatic field,
   a source of polar fluid immiscible with the contaminated fluid flowed through the electrostatic field,
   a source of variable voltage applied to the electrodes,
   and means for varying the voltage in a controlled manner to increase the voltage at a predetermined rate to a predetermined maximum and maintaining the maximum for a predetermined length of time and decreasing the voltage at a predetermined rate to a predetermined minimum and maintaining the minimum for a predetermined length of time,
   whereby the electrostatic field strength is increased at a rate to avoid arcing and is maintained at the maximum strength for shearing and dispersing and uniting the relatively polar fluid with the contaminant and followed by a decreasing field strength in order to coalesce the relatively polar fluid containing the contaminant into large droplets for gravitational separation from the nonpolar fluid.

* * * * *